United States Patent
Hong

(10) Patent No.: US 10,798,032 B2
(45) Date of Patent: Oct. 6, 2020

(54) METHOD, SYSTEM AND RECORDING MEDIUM FOR MESSENGER SERVICE PROVIDING OUTPUT EFFECT

(71) Applicant: LINE Corporation, Shinjuku-ku, Tokyo (JP)

(72) Inventor: Seok Ju Hong, Seongnam-si (KR)

(73) Assignee: Line Corporation, Tokyo (JP)

( * ) Notice: Subject to any disclaimer, the term of this patent is extended or adjusted under 35 U.S.C. 154(b) by 222 days.

(21) Appl. No.: 15/704,315

(22) Filed: Sep. 14, 2017

(65) Prior Publication Data

US 2018/0048596 A1    Feb. 15, 2018

Related U.S. Application Data

(63) Continuation-in-part of application No. PCT/KR2016/008808, filed on Aug. 10, 2016.

(51) Int. Cl.
*H04L 12/58* (2006.01)

(52) U.S. Cl.
CPC ............ *H04L 51/04* (2013.01); *H04L 51/16* (2013.01); *H04L 51/18* (2013.01); *H04L 51/34* (2013.01)

(58) Field of Classification Search
None
See application file for complete search history.

(56) References Cited

U.S. PATENT DOCUMENTS

| | | | | |
|---|---|---|---|---|
| 8,099,253 B1* | 1/2012 | Rau | ................. | G01M 99/008 400/473 |
| 9,830,599 B1* | 11/2017 | Khen | ................. | G06Q 20/4014 |
| 2011/0035696 A1* | 2/2011 | Elazari | ................. | G06F 3/0233 715/773 |
| 2012/0189273 A1* | 7/2012 | Folgner | ................. | H04N 9/8227 386/241 |
| 2012/0266128 A1* | 10/2012 | Kato | ................. | G06F 16/955 717/101 |

(Continued)

FOREIGN PATENT DOCUMENTS

| KR | 10-2002-0074304 A | 9/2002 |
|---|---|---|
| KR | 10-0846424 B1 | 7/2008 |

(Continued)

OTHER PUBLICATIONS

International Search Report PCT/ISA/210 for International Application No. PCT/KR2016/008808 dated May 4, 2017.

(Continued)

*Primary Examiner* — Kevin T Bates
*Assistant Examiner* — Dae Kim
(74) *Attorney, Agent, or Firm* — Harness, Dickey & Pierce, P.L.C.

(57) ABSTRACT

According to at least one example embodiment of the present disclosure, provided is a computer program that is combined with an electronic apparatus embodied via a computer and is stored in a computer-readable recording medium so as to execute a messenger service method including extracting input time information from input data included in a message; calculating output time information according to each of output units based on the input time information; and generating output data including the output time information for display on a display device.

15 Claims, 11 Drawing Sheets

(56) References Cited

U.S. PATENT DOCUMENTS

| | | | | |
|---|---|---|---|---|
| 2013/0198862 A1* | 8/2013 | Guo | ............... | G06F 21/316 |
| | | | | 726/28 |
| 2014/0067965 A1* | 3/2014 | Yamakawa | ............ | H04L 51/04 |
| | | | | 709/206 |
| 2014/0136450 A1* | 5/2014 | Lee | ............... | G06N 7/005 |
| | | | | 706/11 |
| 2017/0180299 A1* | 6/2017 | Garza | ............... | H04L 51/32 |
| 2017/0329745 A1* | 11/2017 | Sharifi | ............ | G06F 17/212 |

FOREIGN PATENT DOCUMENTS

| | | |
|---|---|---|
| KR | 10-2014-0060112 A | 5/2014 |
| KR | 10-2015-0029088 A | 3/2015 |
| KR | 10-2015-0106565 A | 9/2015 |
| KR | 10-2015-0108470 A | 9/2015 |

OTHER PUBLICATIONS

Written Opinion of the International Searching Authority PCT/ISA/237 for International Application No. PCT/KR2016/008808 dated May 4, 2017.

Korean Office Action dated May 13, 2019 for corresponding Korean Application No. 10-2018-7020664.

Kim, Seung Hyon, "Korean Typewriter Ver. 2", NEXTI Scripts, https://www.behance.net/gallery/30709539/Korean-Typewriter-Ver-2-aeScript, (Oct. 28, 2015).

* cited by examiner

METHOD, SYSTEM AND RECORDING MEDIUM FOR MESSENGER SERVICE PROVIDING OUTPUT EFFECT

CROSS-REFERENCE TO RELATED APPLICATIONS

This application is a continuation-in-part of, and claims the benefit of priority under 35 U.S.C. § 365(c) from, PCT International Application No. PCT/KR2016/008808 which has an International filing date of Aug. 10, 2016, which designates the United States of America, the contents of which are hereby incorporated by reference in its entirety.

TECHNICAL FIELD

The present disclosure relates to a messenger service method providing an output effect for representing a circumstance in which a message is input, a system, and/or a non-transitory computer readable recording medium.

BACKGROUND

In general, a messenger refers to software capable of transmitting and receiving a message or data in real-time, and a user may register contacts in the messenger and may exchange a message with another party in a list of the contacts.

Recently, the use of messages has become common not only by using a personal computer (PC) but also in a mobile environment of a mobile communication terminal. For example, the related art disclosed a mobile messenger service system of a portable terminal and a method thereof using a wireless communication network so as to provide a messenger service between mobile messengers installed in respective portable terminals.

The messenger service uses a message output method of displaying an entire input message all together on a terminal of a message receiver when a message sender inputs a transmission command.

SUMMARY

According to at least one example embodiment of the present disclosure, an output message is sequentially output according to each of output units, so that a typing effect is applied to the output message.

Also, according to at least one example embodiment of the present disclosure, output time information is set in consideration of input time information, so that information about a time taken to input parts of a message is provided.

Also, according to at least one example embodiment of the present disclosure, when a message is output, an additional output effect for representing a circumstance of a message sender is applied.

According to an aspect of the present disclosure, there is provided a computer program that is combined with an electronic apparatus embodied via a computer and is stored in a non-transitory computer-readable recording medium so as to execute a messenger service method including an input data analyzing operation of extracting input time information from input data that configures a message; an output time calculating operation of calculating output time information according to each of output units, based on the input time information; and an output data generating operation of generating output data including the output time information for display on a display device.

The input time information may include information about a time taken by a message sender to input the message according to each of input units of the input data.

In the output time calculating operation, if the number of the input units is less than the number of the output units, a time taken to input one input unit from among the input units may be divided by the number of output units corresponding to the one input unit, so that an average output time of the corresponding output units may be calculated as the output time information for each of the corresponding output units.

In the output time calculating operation, if the number of the plurality of input units is more than the number of the plurality of output units, a total sum of a time taken to input input units corresponding to one output unit from among the output units may be determined to be output time information for the one output unit.

In the input data analyzing operation, the input time information corresponding to deleted content may be extracted from the input data, and in the output data generating operation, a time taken to input and delete the content may be excluded from the output time information.

In the input data analyzing operation, the input time information corresponding to deleted content may be extracted from the input data, and in the output data generating operation, output time information corresponding to the deleted content may be calculated to output the deleted content.

In the output time calculating operation, the output time information may be adjusted in consideration of a type of a message sender's terminal.

In the input data analyzing operation, one or more attributes of a message sender's terminal, the one or more attributes being a location, a movement speed, temperature, or illuminance of the message sender's terminal which correspond to the input time information of the input data, may be extracted. The messenger service method may further include an output effect generating operation of determining a circumstance of the message sender's terminal from the one or more attributes of the message sender's terminal, and generating output effect information for representing the circumstance of the message sender's terminal, and in the output data generating operation, output data including the output effect information may be generated.

Each of the input units or each of the output units may be one of a character, a syllable, a word, and a unit identified by spacing.

According to another aspect of the present disclosure, there is provided a messenger service method implemented via a computer, the messenger service method including an input data analyzing operation of extracting input time information from input data that configures a message; an output time calculating operation of calculating output time information according to each of output units based on the input time information; and an output data generating operation of generating output data including the output time information.

According to another aspect of the present disclosure, there is provided a messenger service system of an electronic apparatus embodied via a computer, the messenger service system including at least one processor configured to execute an instruction readable by the computer, wherein the at least one processor includes an input data analyzer configured to extract input time information from input data that configures a message; an output time calculator configured to calculate output time information according to each of output units, based on the input time information; and an output data generator configured to generate output data including the output time information.

According to the present disclosure, a typing effect may be applied to an output message.

Also, according to the present disclosure, a message receiver may recognize information about a time taken to input parts of a message, and thus may infer a circumstance when a message sender inputs the message.

Also, according to the present disclosure, when a message is output, an additional output effect for representing a circumstance of a message sender may be applied, so that a message receiver may understand the circumstance of the message sender.

DETAILED DESCRIPTION

Figure 1:
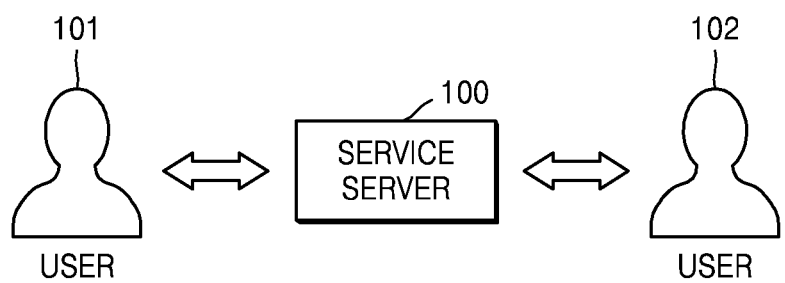
FIG. 1 is a schematic diagram illustrating a relation between a service server and users, according to at least one example embodiment of the present disclosure.

The detailed descriptions of the disclosure are referred to with the attached drawings illustrating particular example embodiments of the disclosure. These example embodiments are provided so that this disclosure will be thorough and complete, and will fully convey the concept of the disclosure to one of ordinary skill in the art. It will be understood that various example embodiments of the disclosure are different from each other and are not exclusive with respect to each other. For example, a particular shape, a particular structure, and a particular feature described in the specification may be changed from at least one example embodiment to another example embodiment without departing from the spirit and scope of the disclosure. Also, it will be understood that a position or layout of each element in each example embodiment may be changed without departing from the spirit and scope of the disclosure. Therefore, the detailed descriptions should be considered in a descriptive sense only and not for purposes of limitation and the scope of the disclosure is defined not by the detailed description of the disclosure but by the appended claims, and all differences within the scope will be construed as being included in the present disclosure. Like reference numerals in the drawings denote like or similar elements throughout the specification.

Hereinafter, the present disclosure will be described in detail by explaining various example embodiments of the disclosure with reference to the attached drawings so as to fully convey the concept of the disclosure to one of ordinary skill in the art.

Various example embodiments of the present disclosure are related to an instant messenger, and more particularly, to a messenger service method providing an output effect, a system, and a recording medium.

A messenger service that is used in a daily life is used for several purposes including a private use, a business use, or the like, and furthermore, the messenger service is used while contacts are divided to several groups according to management aspects, usage purposes, or the like.

The present disclosure provides a technology of including an output effect such as a typing effect in an output message, whereby, when a messenger outputs a received message, it is possible to recognize a circumstance when a message sender inputs a message.

FIG. 1 is a schematic diagram illustrating a relation between a service server and users, according to at least one example embodiment of the present disclosure.

FIG. 1 illustrates users 101 and 102, and a service server 100. The users 101 and 102 may actually refer to user terminals used by the users 101 and 102. In FIG. 1, arrows may indicate that data may be transmitted and received between the user terminals and the service server 100 by using a wired and/or wireless network.

The user terminals used by the users 101 and 102 may refer to all terminal devices capable of installing and executing a messenger service-dedicated application (hereinafter, referred to as the 'messenger app') related to the service server 100, and may include a personal computer (PC), a laptop computer, a smartphone, a tablet PC, a wearable computer, or the like. In this regard, the user terminals may perform, by the control of the messenger app, general operations of services including configuring a service screen, inputting data, exchanging data, storing data, or the like.

The service server 100 functions as a service platform providing a messenger service to clients. In other words, the service server 100 may be a system providing a messenger service capable of transmitting and receiving data in real-time between the users 101 and 102 in which a messenger app is installed. The messenger app may generally include a function of writing and transmitting a text, a function of transmitting multimedia contents (a voice, a picture, a video, etc.), a function of notifying a message, a schedule function, or the like.

In particular, in the present disclosure, the messenger app may include a function of including an output effect such as a typing effect in an output message. The output effect such as a typing effect will be described in detail at a later time. The messenger app may be implemented to be usable not only in a PC environment but also usable in a mobile environment. The messenger app may be implemented to be a program that independently operates, or may be implemented to be an in-app of a particular application and thus may operate in the particular application.

Figure 2:
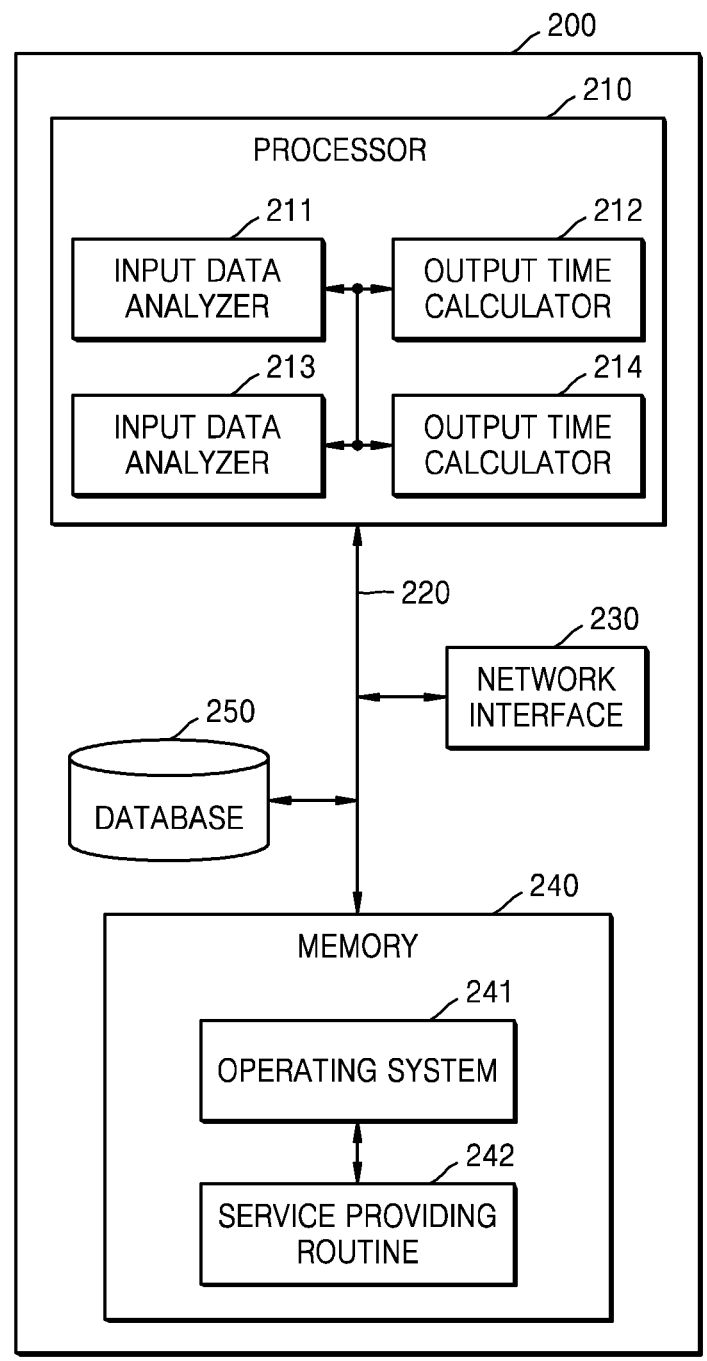
FIG. 2 is a block diagram illustrating an inner configuration of a messenger service system, according to at least one example embodiment of the present disclosure.
Figure 3:
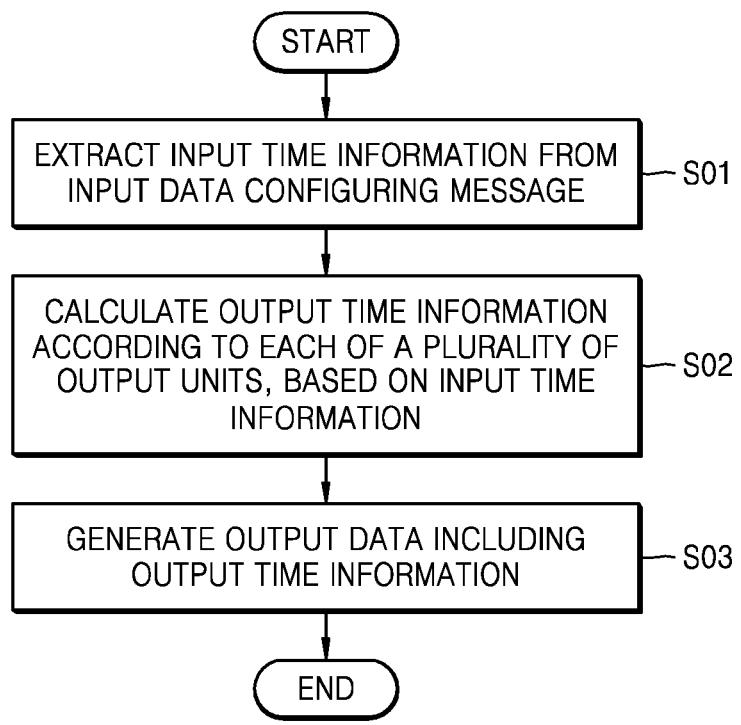
FIG. 3 is a flowchart of a method of executing a messenger service providing an output effect, according to at least one example embodiment of the present disclosure.

FIG. 2 is a block diagram illustrating an inner configuration of a messenger service system, according to at least one example embodiment of the present disclosure, and FIG. 3 is a flowchart of a messenger service method, according to at least one example embodiment of the present disclosure.

A messenger service system 200 according to at least one example embodiment may include at least one processor 210, a bus 220, a network interface 230, a memory 240, and a database 250. The memory 240 may include an operating system 241 and a service providing routine 242. The processor 210 may include an input data analyzer 211, an output time calculator 212, an output effect generator 213, and an output data generator 214. In other example embodiments, the messenger service system 200 may include more elements than the elements shown in FIG. 2.

The memory 240 may be a computer-readable recording medium including a permanent mass storage device such as a random-access memory (RAM), a read-only memory (ROM), and a disk drive. In addition, program codes for the operating system 241 and the service providing routine 242 may be stored in the memory 240. The software elements may be loaded from a separate computer-readable recording medium other than the memory 240 by using a drive mechanism (not shown). The separate computer-readable recording medium may include non-transitory computer-readable recoding mediums (not shown) such as a floppy drive, a disk, a tape, a DVD/CD-ROM drive, a memory card, or the like. In another example embodiment, the software elements may be loaded to the memory 240 not via the computer-readable recording medium but via the network interface 230.

The bus 220 may allow communication and data transmission between the elements of the messenger service system 200. The bus 220 may be configured by using a high-speed serial bus, a parallel bus, a storage area network (SAN), and/or other appropriate communication technology.

The network interface 230 may be a computer hardware element for connecting the messenger service system 200 to a computer network. The network interface 230 may connect the messenger service system 200 to the computer network via wireless or wired connection.

The database 250 may store and maintain all information necessary for providing a messenger service. In this regard, the database 250 may include a list of friends registered in the messenger, messages and data (e.g., pictures, videos, voices, etc.) exchanged through the messenger, various logs, or the like, and may particularly include information (e.g. control conditions according to folders, control targets, etc.) related to a folder function. Referring to FIG. 2, the database 250 is organized and included in the messenger service system 200, but the database 250 is not limited thereto and thus may be omitted according to a system implantation scheme or environment, or all or some of a database may exist as an external database organized in another separate system.

The processor 210 may be configured to process instructions of a computer program by performing basic calculations, logic, and input and output operations of the messenger service system 200. The instructions (e.g., computer readable instructions) may be provided from the memory 240 or the network interface 230 to the processor 210 via the bus 220. The processor 210 may be configured to execute program codes (e.g., computer readable instructions) for the input data analyzer 211, the output time calculator 212, the output effect generator 213, and the output data generator 214. The program codes may be stored in a recording device such as the memory 240.

The messenger service system 200 is implemented in a user terminal that is a main agent to directly use the messenger service, and may interoperate with a service server in a client-server environment and may provide a function to the user terminal that is a client so that a messenger includes an output effect in an output message.

The input data analyzer 211, the output time calculator 212, the output effect generator 213, and the output data generator 214 of the processor 210 may be configured to perform operations S01 through S03 of FIG. 3. Hereinafter, the present disclosure will now be described in detail by referring to configurations of each unit of the processor 210.

First, the input data analyzer 211 extracts input time information from input data. In addition, the input data analyzer 211 may extract attributes of a message sender's terminal, the attributes including a location, a movement speed, temperature, illuminance, or the like of the message sender's terminal which correspond to the input time information of the input data.

According to the present disclosure, input data may refer to data configuring a message input by a message sender and may include not only message content but may also include input time information corresponding to the message content, and an attribute of a message sender's terminal which corresponds to the input time information. For example, the input data analyzer 211 may extract, as the message content, a text of from the input data sent by the message sender, may extract a transmission time of as the input time information, and may extract as the attribute of the message sender's terminal.

According to the present disclosure, the input time information of the input data may include not only the transmission time but may also include information about a time taken to input parts of the message. In more detail, the input time information may include information of a recorded system time corresponding to the message content, and the system time may include information about a time taken to input, by the message sender, the input data according to input units of the message content. In the present disclosure, units such as a character, a phoneme, a phonology, a syllable, a word, or a unit identified by spacing which are divided from the input data so as to obtain input time information may be applied to the input unit without restriction. According to at least one example embodiment of the present disclosure, when the input unit is a character, each of signs including a Korean letter, an English alphabet letter, a numeral, a special character, a punctuation mark, or the like, may be one or more input units. According to at least one example embodiment of the present disclosure, the input unit may vary according to the one or more languages of the input data. For example, when a language of the message content is the Korean language, an input unit of the input data may be a syntactic word, a syllable, character and/or a phoneme, and when the language of the message content is the English language, the input unit of the input data may be a character, a syllable, a word, and/or a unit identified by spacing. Additionally, the input units of a message may include two or more languages as well.

In a selective example embodiment, the input data analyzer 211 may extract information about a time taken to input, by a sender, a message according to each of a plurality of syntactic word units. In order to extract input time information according to each of the syntactic word units, an input data extractor (not shown) may refer to a system time when a space bar was pressed. For example, in a case where the message content is [오늘 회의가][언제였지], the input data analyzer 211 may extract input time information indicating that 2 seconds were required in inputting the syntactic word input unit [오늘], 2 seconds were required in inputting the syntactic word input unit [회의가], and 3 seconds were required in inputting the syntactic word input unit [언제였지?], by using system times corresponding to the message content.

In a selective example embodiment, the input data analyzer 211 may extract information about a time taken to input, by a sender, a message according to each of a plurality of syllable units. For example, when the message content is [오늘 회의가 언제였지], the input data analyzer 211 may extract input time information about each of syllable input units that are [오][늘][호][으][가][언][ㅈ][였][ㅈ], by using the system times corresponding to the message content.

In a selective example embodiment, the input data analyzer 211 may extract information about a time taken to input, by the sender, the message according to each of a plurality of phoneme units. In order to extract input time information according to each of the phoneme units, the input data extractor may refer to a system time whenever the sender does typing. For example, when the message content is [오늘], the input data analyzer 211 may refer to a system time of typing and may extract input time information about each of the phonemes that are, for example, [ㅇ][ㅗ][ㄴ][ㄹ].

The aforementioned selective example embodiments correspond to a case in which a language type of the message content is the Korean language. In another selective example embodiment of the present disclosure, even when a language of the message content is in another language, such as English, etc., the input data extractor may extract input time information in a similar manner to the case of the Korean language.

In a selective example embodiment, the input data analyzer 211 may extract information about a time taken by the sender to input a message according to each unit identified by spacing (e.g., a space character). For example, in order to extract input time information of each unit identified by spacing, the input data analyzer 211 may refer to a system time when a space bar was pressed. For example, when the message content is, the input data analyzer 211 may extract information indicating that two seconds were required to input, two seconds were required to input, and three seconds were required to input, by using a system time corresponding to the message content.

In a selective example embodiment, the input data analyzer 211 may extract information about a time taken by the sender to input a message according to each character unit. For example, when the message content is [How are you?], the input data analyzer 211 may extract input time information of each of characters by using at least one system time corresponding to the message content.

In addition to the aforementioned examples, an input unit of the input time information to be extracted by the input data analyzer 211 may be variously changed, and a method of calculating a time taken to input each of input units may be variously changed to achieve the purpose therefor.

In a selective example embodiment, the input data analyzer 211 may extract input time information about deleted content that was deleted when the message sender was writing the message. For example, the input data analyzer 211 may extract the input time information about a time taken to input the deleted content and a time taken to delete the deleted content.

In a selective example embodiment, the input data analyzer 211 may extract attributes of a message sender's terminal, the attributes including a location, a movement speed, temperature, illuminance, or the like, of the message sender's terminal which correspond to input time information of input data. That is, it is possible to extract a plurality of pieces of information for easily recognizing a circumstance of the message sender's terminal when the input data was writing. In addition to the location, the movement speed, the temperature, and the illuminance, the input data analyzer 211 may extract other attributes for recognizing the circumstance of the message sender's terminal. The attributes of the message sender's terminal may be reference values in generating an output effect to be described below.

The output time calculator 212 calculates output time information according to each of output units, based on input time information. In the present disclosure, units such as a character, a phoneme, a phonology, a syllable, a word, or a unit identified by spacing which are divided from output data so as to obtain a output time per unit may be applied to the output unit without restriction. According to at least one example embodiment of the present disclosure, when an output unit is a character, each of signs including a Korean letter, an English alphabet letter, a numeral, a special character, a punctuation mark, or the like, may each be an output unit. According to at least one example embodiment of the present disclosure, the output unit may vary according to the languages of the output data. For example, when a language of message content is in the Korean language, the output unit may be a syntactic word, a syllable, character or a phoneme, and when the language of the message content is in the English language, the output unit may be a character, a syllable, a word, or a unit identified by spacing, etc.

According to the present disclosure, in order to generate output data to which a circumstance when a message sender inputs a message is reflected, output time information according to each of output units to be included in the output data may be calculated. Thus, according to the present disclosure, due to the output time information being calculated by the output time calculator 212, a typing effect may be applied to an output message, and information about a time taken to input parts of a message may be provided to a message receiver.

In a selective example embodiment, if the number of input units is less than the number of output units, the output time calculator 212 may divide a time taken to input one input unit by the number of output units corresponding to the input unit, and may determine an average output time of each of the output units to be output time information of each output unit. For example, it may be assumed that an input unit is a syntactic word, a word, or a unit identified by spacing, and an output unit is a syllable, a phoneme, or a character. In this case, input time information and output time information cannot match with each other (e.g., the input time information and the output time information are not equal), thus, the output time information may be separately calculated to reflect the input time information thereto. For example, if a time taken to input a word is 5 seconds, and the number of characters corresponding to the word is 10, it is possible to infer that 0.5 seconds is on average required in inputting one character, thus, the output time calculator 212 may calculate an output time interval of each of the characters to be output to be 0.5 seconds.

In a selective example embodiment, if the number of input units is more than the number of output units, the output time calculator 212 may determine a total sum of time taken to input the input units (e.g., individual characters) that correspond to one output unit (e.g., a word) to be output time information of the one output unit. As an example, the input unit may be assumed to be a phoneme, a syllable or a character, and the output unit may be assumed to be a syntactic word, a word, or a unit identified by spacing. In this regard, a value of summing times taken to input the phoneme input units may be output time information of the corresponding word. As another example, output time information of an output unit may be calculated by referring to a system-recorded time until input units are gathered, and then is used to generate the output unit.

In a selective example embodiment, if the number of input units is equal to the number of output units (as the input units are the same type as output units), the output time calculator 212 may match the input time information with the output time information. For example, if both the input units and the output units are characters, the output time calculator 212 may refer to information about the time taken in each typing during an input, thereby calculating output time information matching with the information.

In a selective example embodiment, the output time calculator 212 may adjust output time information in consideration of a type of the message sender's terminal. According to various types of user terminals, the user terminals may have different input interfaces used in inputting a message, thus, an average time of inputting, by users, a message may vary. For example, a typing speed in inputting a message via a PC (e.g., using a keyboard) may be generally faster than that via a mobile terminal (e.g., using a touchscreen). Thus, in order to compensate for a difference between output times occurring due to the user input device types of the message sender's terminal, the present disclosure may adjust information of a total output time in which a message is output, according to the user input device type of the message sender's terminal. For example, if an input time of an entire message input via the mobile terminal is 10 seconds, the output time calculator 212 may adjust output time information of each output unit so as to allow a total output time of a message to be 5 seconds. In addition to the described example, if typing via an input interface of the message sender's terminal is convenient, the output time calculator 212 may adjust an output time of a message to be increased, or if it is not easy for typing, the output time calculator 212 may adjust the output time of the message to be decreased.

In a selective example embodiment, when deleted content is included in input data, the output time calculator 212 may calculate output time information in consideration of the input time information corresponding to the deleted content. The deleted content refers to content that is deleted when a message sender deletes a part of already-input message content while the message sender inputs a message. According to at least one example embodiment of the present disclosure, an output message may be displayed according to a sequentially-input order of output units based on input time information, thus, whether to reflect input time information of the deleted content to the output time information is a matter to be considered.

According to at least one example embodiment of the present disclosure, a time taken for the message sender to input and delete the deleted content may be excluded from the output time information. For example, if the message sender inputted and then deleted a word 'a', the word 'a' is not displayed on the output message and a time taken to input and delete the word 'a' may not be considered for the output time information. That is, information about whether the word 'a' was input and deleted by the message sender and a time taken to input and delete the word 'a' may not be provided to a message receiver.

Additionally, according to another example embodiment of the present disclosure, time information corresponding to the deleted content may be calculated to display the deleted content on a terminal of the message receiver. For example, if the message sender inputted and then deleted the word 'a', an output time may be set so that the word 'a' may be output to and then deleted from an output message. That is, information about whether the word 'a' was input and deleted by the message sender and a time taken to input and delete the word 'a' may be provided to the message receiver.

The output effect generator 213 determines a circumstance of the message sender's terminal, and generates output effect information for representing the circumstance of the message sender's terminal. In this regard, an output effect may indicate that an emotion (e.g., emoji), a picture, an animation, a sticker, a video, a sound, or the like is used in outputting a message, and in addition to the aforementioned examples, effects capable of reflecting a circumstance when the message is input may be applied without a limit. That is, according to the present disclosure, by generating the output time information, an additional output effect for reflecting a circumstance of the message sender while inputting the message may be applied thereto. By doing so, the message receiver may obtain additional information about the circumstance of the message sender.

In more detail, according to at least one example embodiment of the present disclosure, in order to reflect the circumstance of the message sender to an output message, the output effect information for representing the circumstance of the message sender's terminal may be generated. In this regard, the circumstance of the message sender's terminal may be determined by a location, a movement speed, temperature, illuminance, or the like that are attributes of the message sender's terminal. Examples of the circumstance of the message sender's terminal may include 'in a subway train', 'mountain climbing', 'in an office', 'driving a car', or the like, and for example, if the circumstance of the message sender's terminal corresponds to 'driving a car', the output effect information to which an emoticon indicating driving a car and a car picture are inserted may be generated. For example, if the location of the message sender's terminal is in the underground (of which altitude is equal to or less than a desired and/or predetermined reference), and a movement speed is 75 km/h, the circumstance of the message sender's terminal may be determined to be in the subway train, and the output effect information for indicating being in the subway train may be generated. The generated output effect information may be included in output data to be helpful for the message receiver to understand the circumstance of the message sender. In addition, if the circumstance of the message sender's terminal satisfies a desired and/or predetermined condition, a desired and/or preset particular action may be executed. For example, if the circumstance of the message sender's terminal is determined to be driving a car, when a desired and/or preset time elapses after a message is written, the message may be set to be automatically sent even if a send button is not pressed.

Next, the output data generator 214 generates the output data including the output time information and the output effect information. The generated output data may be output to a messenger application of a user terminal, and compared to the related art in which an entire message is popped up at one time, the generated output data may help the message receiver to understand the circumstance of the message sender.

FIG. 3 is a flowchart of a method of executing a messenger service providing an output effect, according to at least one example embodiment of the present disclosure.

First, input time information is extracted from input data configuring a message (S01).

Next, based on the input time information, output time information according to each of a plurality of output units is calculated (S02).

Next, output data including the output time information is generated (S03).

Figure 4A:
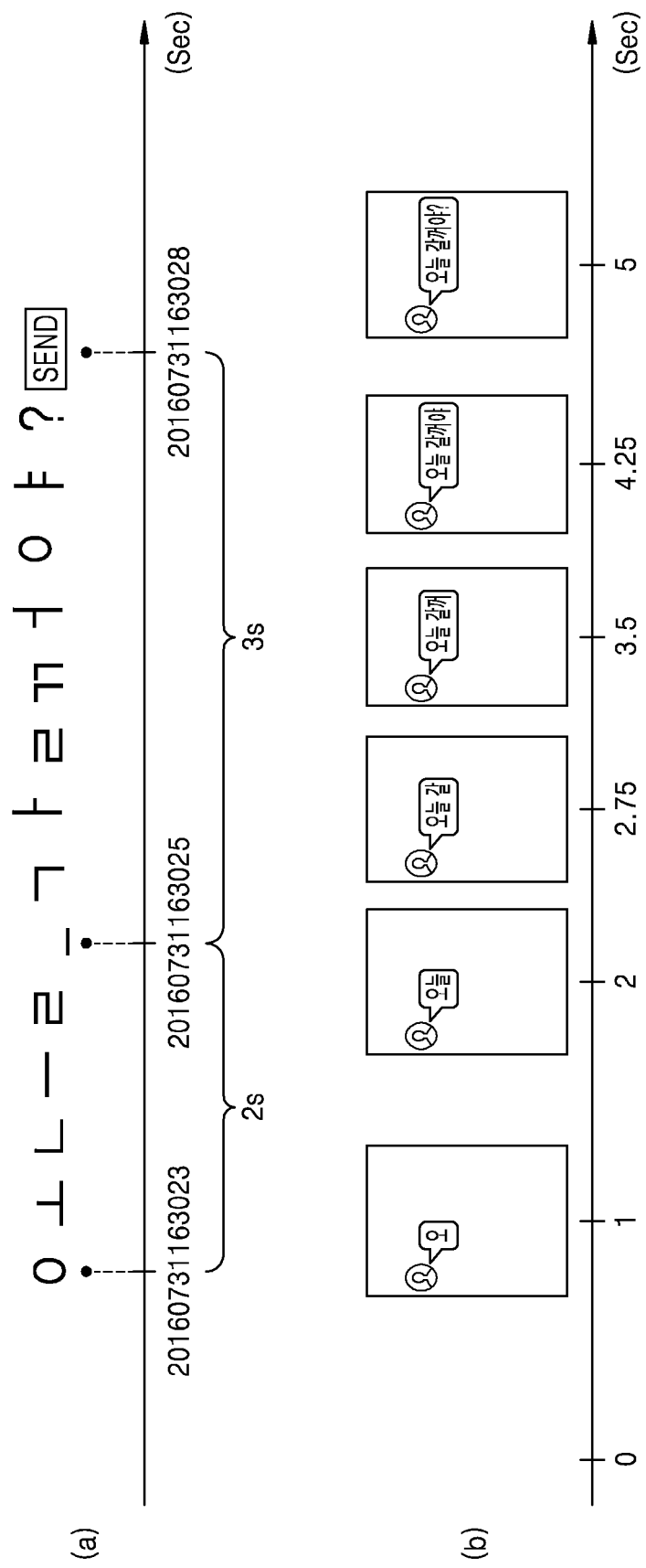
FIGS. 4A to 4B, 5A to 5B, 6A to 6B, and 7 are diagrams for describing a method of outputting a message, according to example embodiments of the present disclosure.
Figure 4B:
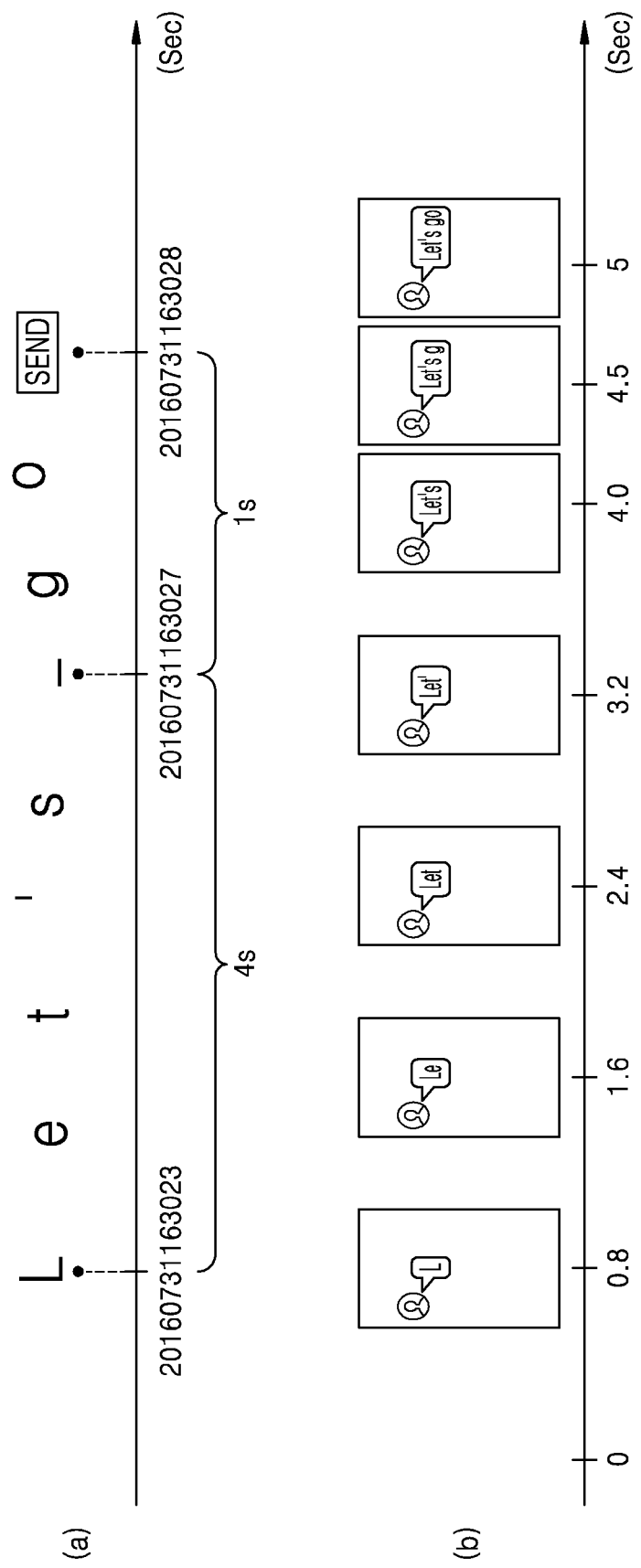

FIGS. 4A and 4B are diagrams for describing a method of outputting a message, according to at least one example embodiment of the present disclosure.

FIG. 4A illustrates the example embodiment in which, when input and output messages are in the Korean language, the number of input units is less than an output the number of output units (that is, each of the input units is divided into one or more corresponding output units), where the input unit is a syntactic word and the output unit is a syllable, according to at least one example embodiment of the present disclosure.

First, as illustrated in (a) of FIG. 4A, when message content of input data is [오늘 갈꺼야?], a message sender types ''ㅇㅗㄴㅡㄹ_ㄱㅏㄹㄲㅓㅇㅑ?'' on a sender's terminal. In this regard, an input message may include a start time and an end time of the typing, and a system time when a space bar was input. For example, when recorded system times indicate 20160731163023 for the start time of the typing, 20160731163025 for the input of the space bar, and 20160731163028 for the end time of the typing (or when a message send button is pressed), it is possible to infer that 2 seconds were taken to input [오늘], and 3 seconds were taken to input [갈꺼야]?.

Output time information is generated based on the input time information, and in this regard, the output time information may include an average output time of each of output units which is obtained by dividing a time taken to input one input unit by the number of the output units corresponding to the input unit. That is, as illustrated in (b) of FIG. 4A, [오늘] includes 2 syllables and an input time therefor is 2 seconds, thus, an output time of 1 second may be allocated to an output of each of [오] and [늘]. In addition, [갈꺼야]? includes 4 syllables (a special letter is regarded as 1 syllable) and an input time therefor is 3 seconds, thus, an output time of ¾=0.75 second may be allocated to an output of each syllable. Thus, a message having a typing effect with a time interval as marked on a timeline of (b) of FIG. 4A may be output.

Next, FIG. 4B illustrates at least one example embodiment for describing a case in which, when input and output messages are in the English language, the number of input units is less than the number of output units (that is, each of the input units is divided into one or more corresponding output units), according to at least one example embodiment of the present disclosure, the case assuming that the input unit (each of the input units) is a unit identified by spacing, and the output unit (each of the output units) is a character. As described above, according to at least one example embodiment of the present disclosure, when an input unit is a character, each of signs including an alphabet letter, a numeral, a special character, a punctuation mark, or the like, may be an input unit.

First, as illustrated in (a) of FIG. 4B, when message content of input data is , a message sender types 'Let's_go' on a sender's terminal. In this regard, an input message may include a typing start time and end time, and a system time when a space bar was pressed. For example, according to a recorded start time, when the typing start time is 20160731163023, when a time the space bar was pressed is 20160731163027, and when the typing end time (or when a message send button is pressed) is 20160731163028, it is possible to infer that 4 seconds were taken to input, and 1 second was taken to input [go].

Output time information may be generated based on the input time information of the transmitted message, and in this regard, the output time information may include an average output time of each of output units which is obtained by dividing a time taken to input one input unit by the number of the output units corresponding to the input unit. That is, as illustrated in (b) of FIG. 4B, includes 5 characters and the input time therefor is 4 seconds, thus, an output time of ⅘=0.8 seconds may be allocated to outputting each of. Also, includes 2 characters and the input time therefor is 1 second, thus, an output time of ½=0.5 seconds may be allocated to outputting each of. Thus, a message having a typing effect may be output at time intervals as marked on a timeline illustrated in (b) of FIG. 4B.

Figure 5A:
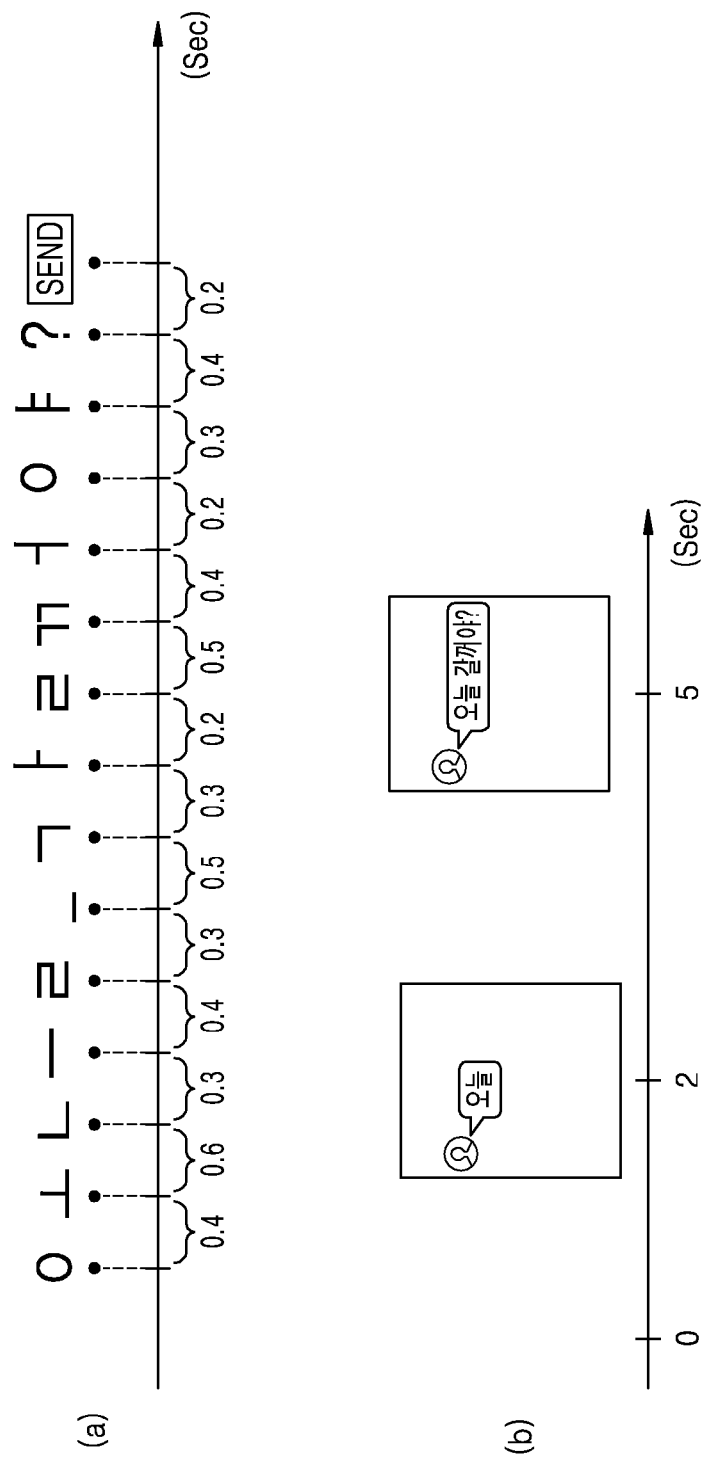
Figure 5B:
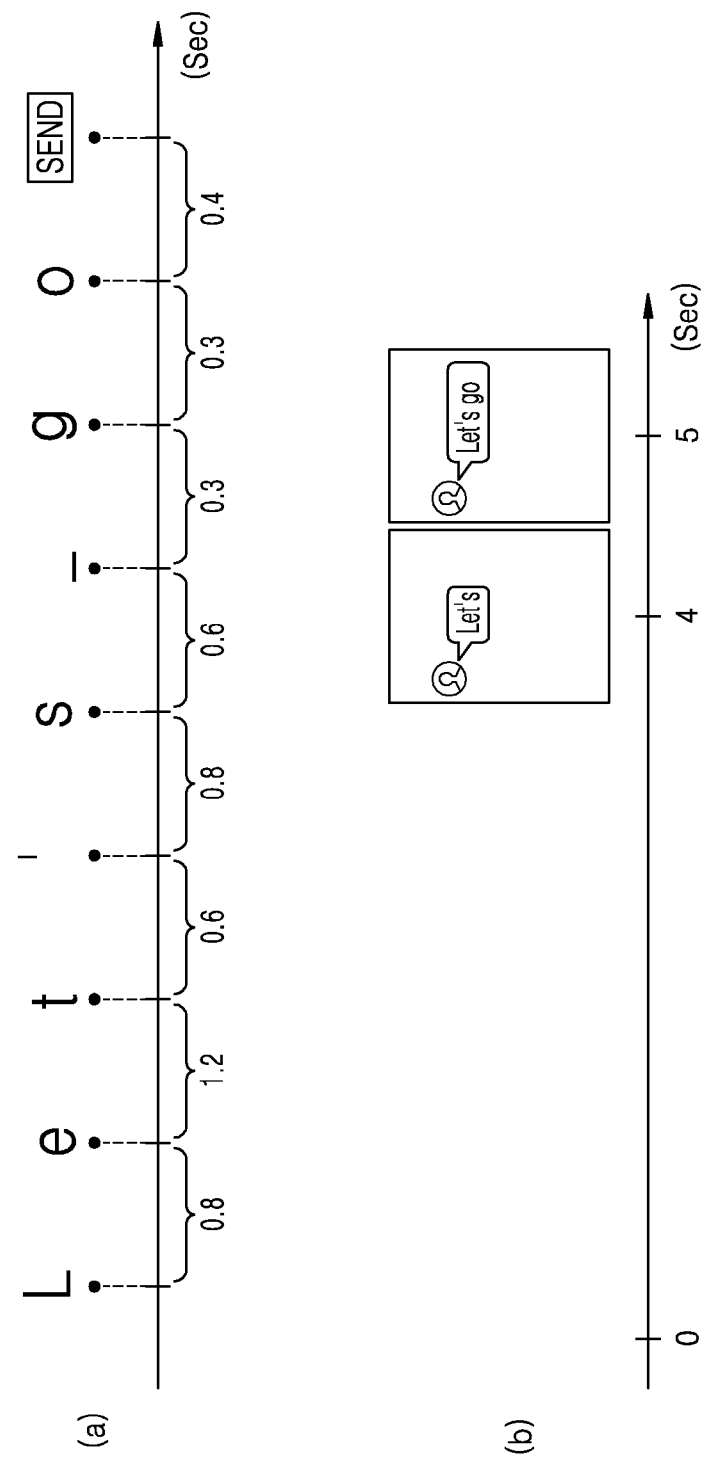

FIGS. 5A and 5B are diagrams for describing a method of outputting a message, according to at least one example embodiment of the present disclosure FIG. 5A illustrates the example embodiment in which, when input and output messages are in the Korean language, the number of input units is more than the number of output units (that is, input units are combined as a corresponding output unit), where the input unit is a phoneme and the output unit is a syllable, according to at least one example embodiment of the present disclosure.

As illustrated in (a) of FIG. 5A, when the message content of input data is [오늘 갈꺼야?], a message sender types 'ㅇㅗㄴㅡㄹ_ㄱㅏㄹㄲㅓㅇㅑ?' on a sender's terminal. In this regard, an input message may include a time interval by which a sender does each typing. For example, as illustrated in (a) of FIG. 5A, input time information indicating that a time interval of 0.4 second is present between the typing of [ㅇ] and the typing of [ㅗ] may be included in the input data.

The present disclosure generates output time information based on the input time information, and in this regard, the output time information may be calculated as output time information of one output unit which indicates a value of a total sum of a time taken to input the input units corresponding to the one output unit.

That is, as illustrated in (b) of FIG. 5A, it is possible to understand, based on the total sum, that a total of 2 seconds was required to input 'ㅇㅗㄴㅡㄹ_' and a total of 3 seconds was required to input 'ㄱㅏㄹㄲㅓㅇㅑ?', and in this case, [오늘] and [갈꺼야] each having a typing effect may be output at time intervals as marked on a timeline illustrated in (b) of FIG. 5A.

Obviously, even when the number of input units is more than the number of output units as in FIG. 5A, if the input time information does not include a time taken to input each input unit but includes information about a system time for each input unit, the output time information of the one output unit may be calculated by referring to the system-recorded times until the input units are gathered to generate the one output unit. For example, in input time information with respect to each typing of ''ㅇㅗㄴㅡㄹ_ㄱㅏㄹㄲㅓㅇ?'', when a system time of an input of 'ㅇ' is 201608011620, and a system time of an input of '_' (space bar) is 201608011622, it is possible to calculate that output time information of an output unit '오늘' corresponds to 2 seconds.

Additionally, FIG. 5B illustrates at least one example embodiment in which, when input and output messages are in the English language, the number of input units is more than the number of output units (that is, input units are combined as a corresponding output unit), where the input unit is a character and the output unit is a unit identified by spacing, according to at least one example embodiment of the present disclosure. For example, when message content of input data is [Let's go], the input units may indicate each being an alphabet letter or a punctuation mark, and the output units may indicate each being identified by spacing.

In more detail, as illustrated in (a) of FIG. 5B, in order to input that is the message content of the input data, a message sender types on a sender's terminal. In this regard, an input message may include a time interval by which a sender does each typing. For example, as illustrated in (a) of FIG. 5B, input time information indicating a time interval of 0.8 seconds between typing and typing may be included in the input data.

The messenger service method according to at least one example embodiment of the present disclosure may generate output time information based on the input time information, and in this regard, a total sum of a time taken to input the input units corresponding to one output unit may be calculated as output time information of the one output unit. That is, as illustrated in (b) of FIG. 5B, it is apparent that a total sum of 4 seconds (0.8+1.2+0.6+0.8+0.6) was taken to input , and a total sum of 1 second (0.3+0.3+0.4) was taken to input, and in this case, and each having a typing effect with a time interval as marked on a timeline of (b) of FIG. 5B may be output.

Figure 6A:
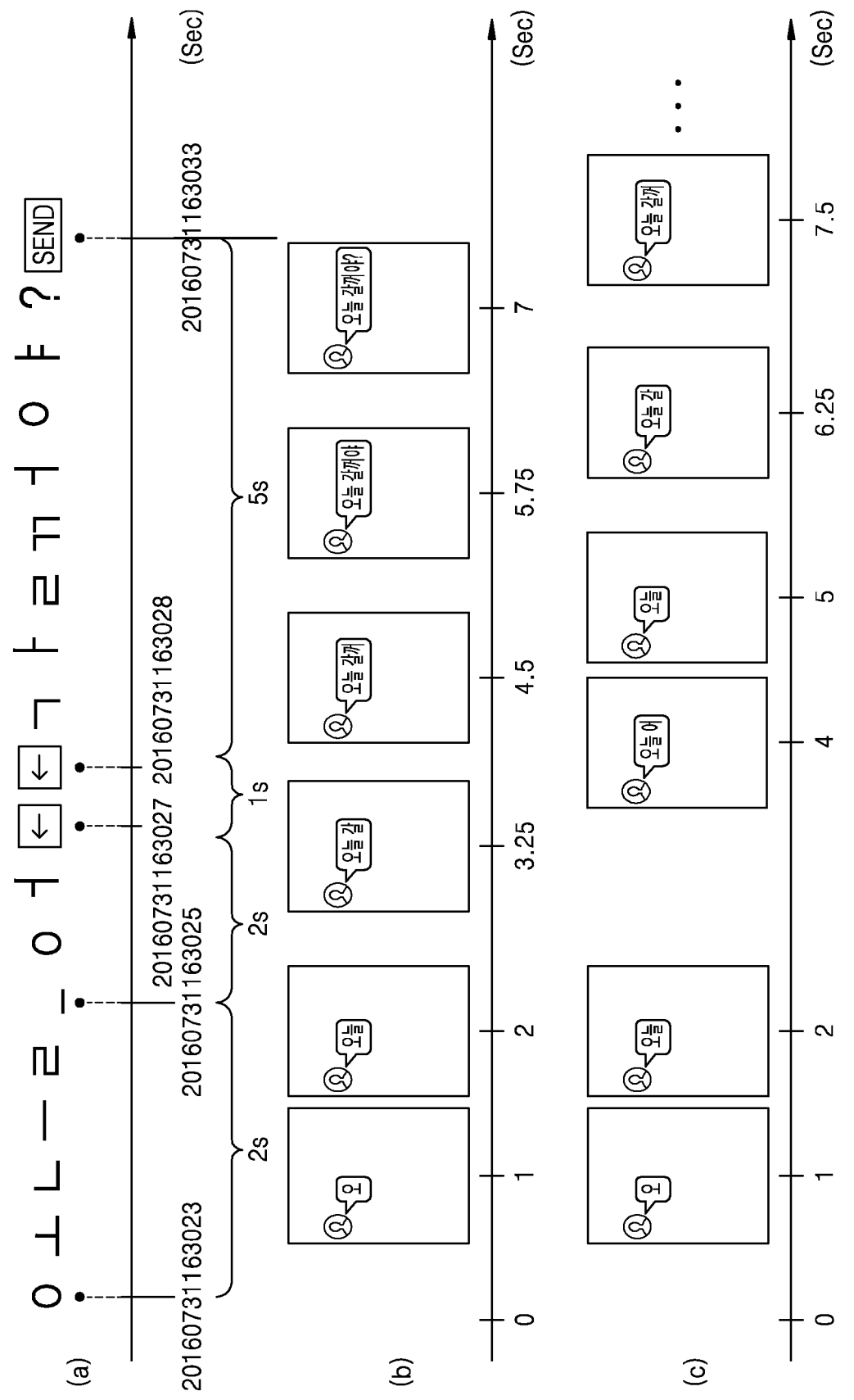
Figure 6B:
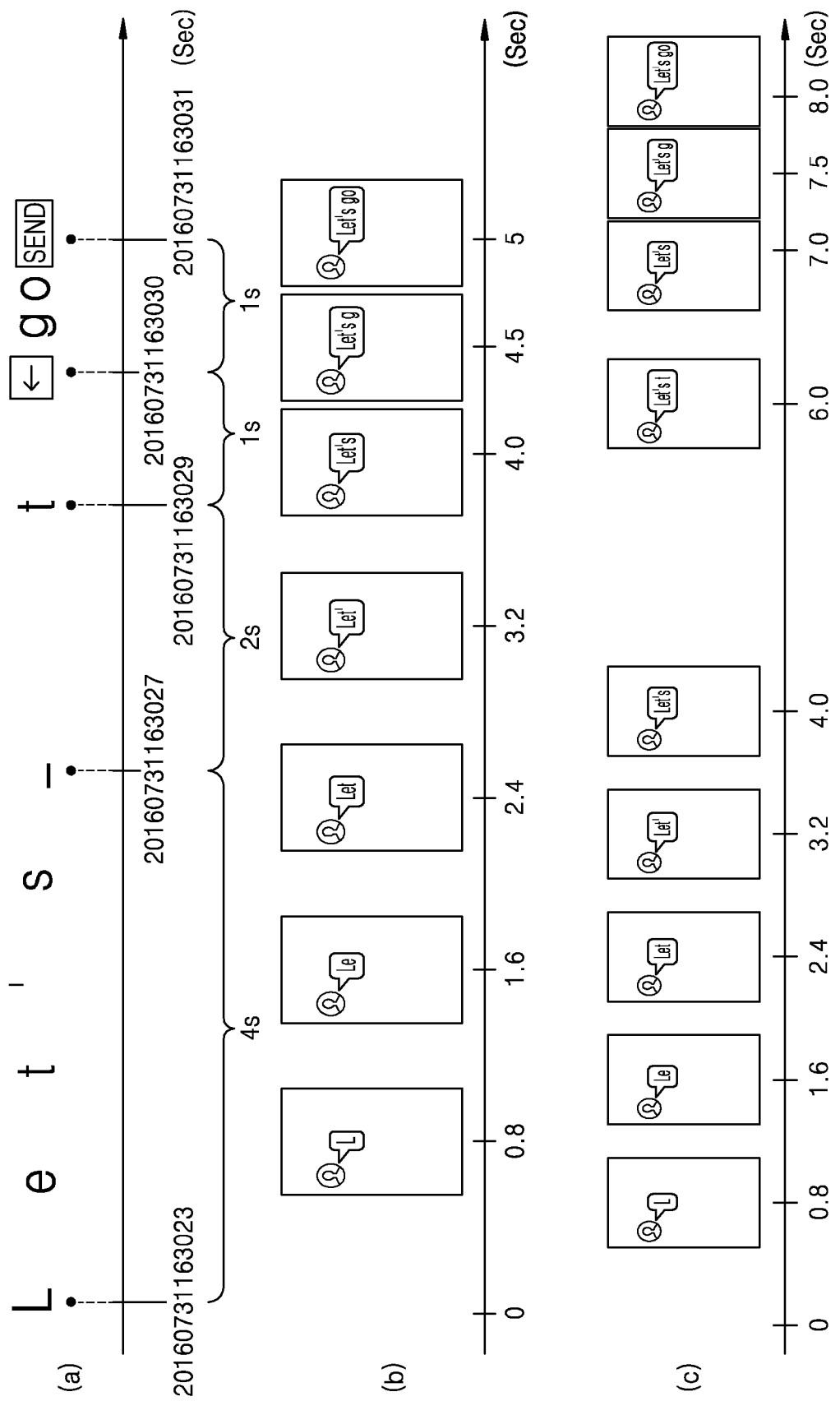

FIGS. 6A and 6B are diagrams for describing a method of outputting a message, according to at least one example embodiment of the present disclosure.

FIG. 6 illustrates a method of calculating output time information by referring to deleted content when input and output messages are in the Korean language and the deleted content is included in input data.

As illustrated in (a) of FIG. 6A, when a message sender inputs a message [오늘    갈꺼야?], the message sender may type 'ㅇㅗㄴㅡㄹ_ㅇㅓ←←ㄱㅏㄹㄲㅓㅇㅏ?' (where ← indicates a backspace). That is, [어] was input and then deleted, thereby becoming deleted content.

According to at least one example embodiment of the present disclosure, as illustrated in (b) of FIG. 6A, the deleted content may not be displayed on an output message, and a time taken to input and delete the deleted content may be excluded from output time information. Referring to output messages in (b) of FIG. 6A, since 2 seconds were required in inputting 'ㅇㅗㄴㅡㄹ_', an output time of 1 second may be allocated to each of outputs of [오] and [늘], and since 5 seconds were required in inputting ?', an output time of 5/4=1.25 seconds may be allocated to each of the outputs of [갈][꺼][야]. That is, according to at least one example embodiment of the present disclosure, output time information may be calculated in consideration of and/or based on only a time taken to input message content, and an input unit, e.g., [어], that is deleted (e.g., deleted content) may not be output, and the time taken to type the deleted content [어] or the time taken to delete the deleted content [어] may not be considered in generating the output message.

According to another example embodiment of the present disclosure, as illustrated in (c) of FIG. 6A, the deleted content may be displayed on the output message, and output time information corresponding to the deleted content may be calculated to display the deleted content. To do so, in at least one example embodiment of the present disclosure in which an input unit is a syntactic word and an output unit is a syllable, not only a system time when a space bar was pressed but also a system time when a backspace or (Delete) was pressed may be recorded to input data. Referring to (a) of FIG. 6A, it is possible to see that it took 2 seconds to input [어] that is the deleted content and then to press a first backspace, and then it took 1 second to completely delete [어 ]by pressing a second backspace.

Thus, as illustrated in (c) of FIG. 6, [오늘 어] is output at 4-sec of a timeline, and [오늘] is output at 5-sec in consideration of such deleted content, so that a message receiver may infer the deleted content and a time taken to write the deleted content.

FIG. 6B is a diagram for describing a method of calculating output time information by referring to deleted content when input and output messages are in the English language and the deleted content is included in input data.

As illustrated in (a) of FIG. 6B, when a message sender inputs a message , the message sender may type (where ← indicates a backspace). That is, was input and then deleted, thereby becoming deleted content.

According to at least one example embodiment of the present disclosure, as illustrated in (b) of FIG. 6B, the deleted content may not be displayed on an output message, and a time taken to input and delete the deleted content may be excluded from the output time information. Referring to an output message in (b) of FIG. 6B, a total sum of 4 seconds was taken to input, thus, an output time of ⅘=0.8 seconds may be allocated to outputting each of. Also, a total sum of 1 second was taken to input, thus, an output time of ½=0.5 seconds may be allocated to outputting each of. That is, according to at least one example embodiment of the present disclosure, output time information may be calculated by referring to only a time taken to input message content, and the deleted content may not be output and a time taken to type or delete may not be considered when the output message is generated.

According to another example embodiment of the present disclosure, as illustrated in (c) of FIG. 6B, the deleted content may be displayed on an output message, and output time information corresponding to the deleted content may be calculated to display the deleted content. To do so, in at least one example embodiment of the present disclosure in which an input unit is a unit identified by spacing and an output unit is a character, not only a system time when a space bar was pressed but also a system time when a backspace or (Delete) was pressed and a time when a character to be deleted by the backspace or (Delete) was pressed may be recorded to input data. Referring to (a) of FIG. 6B, it is apparent that it took 2 seconds to input that is the deleted content and then to press a first backspace, and then it took 1 second to completely delete [t] by pressing a second backspace. Thus, as illustrated in (c) of FIG. 6B, is output at 6-sec of a timeline, is output at 7-sec, and is output at 7.5-sec in consideration of such deleted content, so that a message receiver may infer the deleted content and a time taken to write the deleted content.

Figure 7:
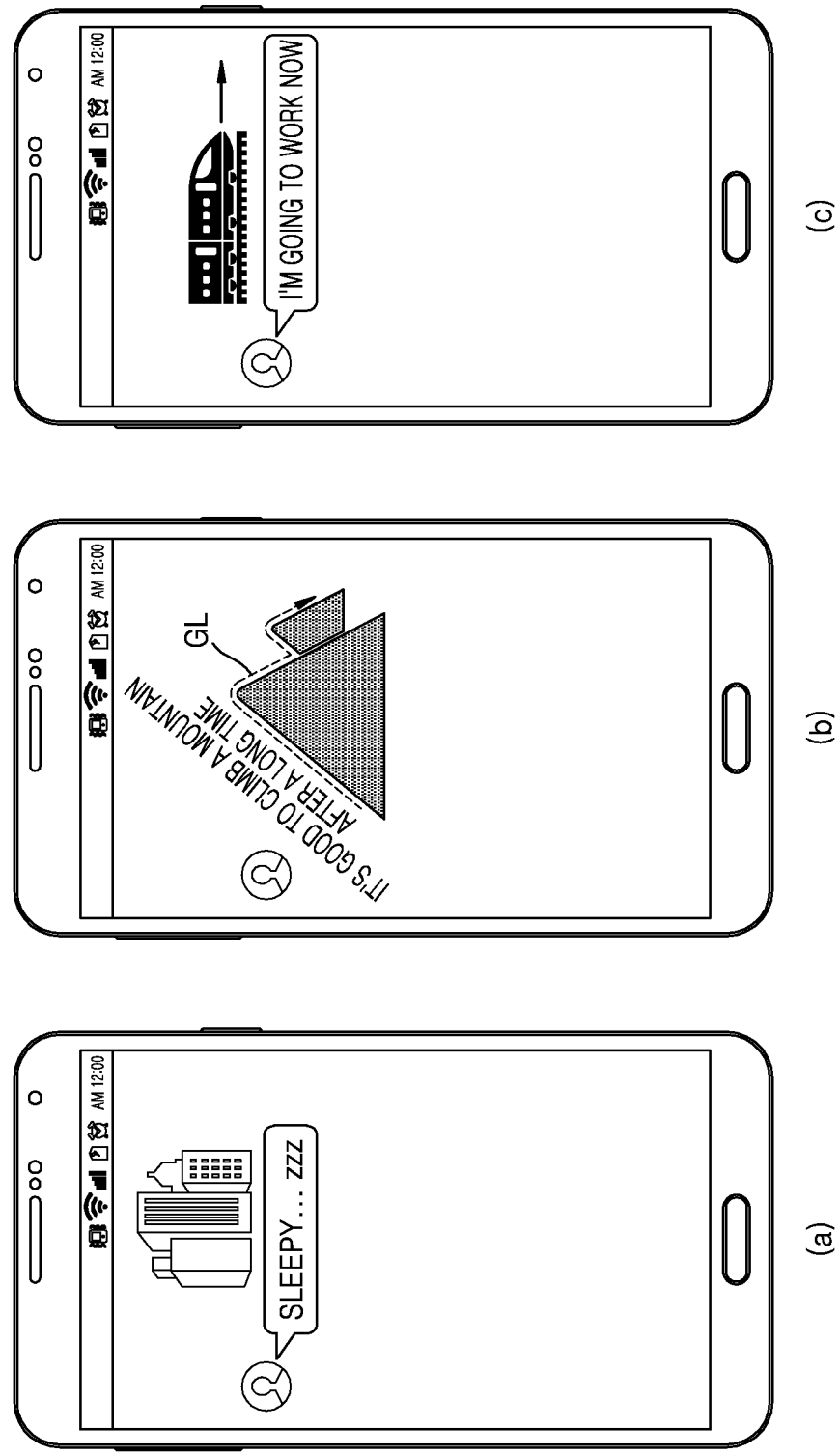

FIG. 7 is a diagram for describing a method of outputting a message, according to at least one example embodiment of the present disclosure.

FIG. 7 is related to descriptions in which one or more attributes such as a location, a movement speed, temperature, illuminance, or the like, of a message sender's terminal which correspond to input time information of input data are extracted to determine a circumstance of the message sender's terminal, and output effect information for representing the circumstance is generated.

Referring to (a) of FIG. 7, in consideration of a location and temperature of the message sender's terminal when a message sender inputs a message saying , a circumstance of the sender's terminal is at work. In this case, as described above, message content may be output based on output time information associated with and/or according to each of the plurality of output units, and in addition to the message content, as illustrated in (a) of FIG. 7, a picture of an office building may be output as an output effect.

Referring to (b) of FIG. 7, when the message sender inputs a message saying, a circumstance of the sender's terminal may be determined to be climbing a mountain, in consideration of the sender terminal's location, altitude, and movement speed obtained using sensors associated with the sender's terminal. Thus, in an example shown in (b) of FIG. 7, text content is output based on output time information while the text content is output to follow along a guideline GL, so that an output effect may be created whereby the text content looks to be climbing a mountain.

Referring to (c) of FIG. 7, when the message sender inputs a message saying [I'm going to work now], a circumstance of the sender's terminal may be determined to be in a subway train, in consideration of the location and movement speed of the sender's terminal. Thus, in an example shown in (c) of FIG. 7, text content is output based on output time information while an animation in which an emoticon in a form of a subway train moves rightward is provided, so that a circumstance of the message sender may become further understandable.

Screen images illustrated in FIGS. 4 through 7 illustrate example embodiments for a better understanding of the present disclosure, thus, the present disclosure is not limited thereto, and a configuration or an order of a screen may be changed.

Figure 8:
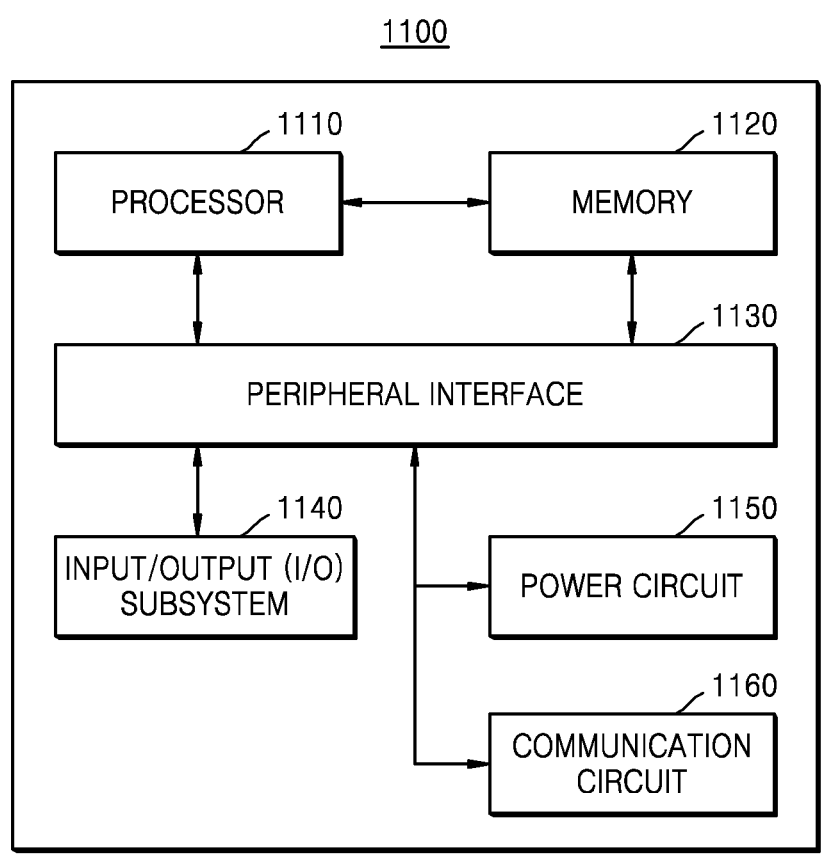
FIG. 8 is a block diagram for describing an example of an inner configuration of a computer system, according to at least one example embodiment of the present disclosure.

FIG. 8 is a block diagram for describing an example of an inner configuration of a computer system, according to at least one example embodiment of the present disclosure.

As illustrated in FIG. 8, a computer system 1100 may include at least one processor 1110, a memory 1120, a peripheral interface 1130, an input/output (I/O) subsystem 1140, a power circuit 1150, and a communication circuit 1160. In this regard, the computer system 1100 may correspond to a user terminal.

The memory 1120 may include a high-speed random-access memory (high-speed RAM), a magnetic disc, an SRAM, a DRAM, a read-only memory (ROM), a flash memory, or a non-volatile memory. The memory 1120 may include a software module, an instruction set, or many other data for operations of the computer system 1100. In this regard, accessing the memory 1120 from another component such as the processor 1110, the peripheral interface 1130, or the like may be controlled by the processor 1110.

The peripheral interface 1130 may combine an input and/or output (I/O) peripheral devices of the computer system 1100 with the processor 1110 and the memory 1120. The processor 1110 may execute the software module or the instruction set stored in the memory 1120, thereby performing various functions and processing data for the computer system 1100.

The I/O subsystem 1140 may combine various I/O peripheral devices with the peripheral interface 1130. For example, the I/O subsystem 1140 may include a controller for combining peripheral devices such as a monitor, a keyboard, a mouse, a printer, or if required, a touchscreen, a sensor, or the like with the peripheral interface 1130. According to another aspect, the I/O peripheral devices may be combined with the peripheral interface 1130 without using the I/O subsystem 1140.

The power circuit 1150 may supply power to all or some of components in a terminal. For example, the power circuit 1150 may include a power management system, at least one power such as a battery or an alternating current (AC), a charging system, a power failure detection circuit, a power converter or an inverter, a power state marker, or any other components for generating, managing, and distributing power.

The communication circuit 1160 may allow communication with another computer system to be performed by using at least one external port. Alternatively, as described above, if required, the communication circuit 1160 may include a radio frequency (RF) circuit to transmit and receive a radio frequency (RF) signal known as an electromagnetic signal, thereby allowing communication with another computer system.

The example embodiment of FIG. 8 is an example of the computer system 1100, and the computer system 1100 may have a configuration or arrangement in which some of the components illustrated in FIG. 8 are omitted, an additional component not illustrated in FIG. 8 is further included, or two or more components are combined. For example, a computer system for a communication terminal in a mobile environment may further include a touchscreen, a sensor, or the like, in addition to the components illustrated in FIG. 8, and may include a circuit for RF communication of various communication technologies (WiFi, third generation (3G), Long-Term Evolution (LTE), Bluetooth, near field communication (NFC), ZigBee, etc.). Components that may be included in the computer system 1100 may be embodied as hardware including an integrated circuit specialized in processing one or more signals or an application, software, or a combination of hardware and software.

As described above, according to the example embodiments of the present disclosure, an output message is sequentially output according to each of output units, so that a typing effect may be applied to the output message.

Also, according to the example embodiments of the present disclosure, output time information is set in consideration of input time information, thus, it is possible to check information about a time taken to input parts of a message.

Also, according to the example embodiments of the present disclosure, when a message is output, an additional output effect for representing a circumstance of a message sender is applied, thus, a message receiver may further understand the circumstance of the message sender.

The methods according to the example embodiments of the present disclosure may also be embodied as programmed instructions to be executed in various computer systems, and then may be recorded in a computer-readable recording medium. In particular, the program according to the present example embodiment may be configured as a PC-based program or an application only for a mobile terminal. The messenger application to which the present disclosure is applied may be installed in a user terminal via a file provided by a file distribution system. For example, the file distribution system may include a file transmitter (not shown) to transmit the file in response to a request from the user terminal.

The messenger service method may include reduced operations or additional operations based on detailed descriptions about the messenger service system provided above with reference to FIGS. 1 through 8. In addition, two or more operations may be combined, or an order or positions of the operations may be changed.

A device described above may be embodied as a hardware element, a software element, and/or a combination of the hardware element and the software element. For example, the device and the elements described in the example embodiments may be embodied by using one or more general-use computers or a special-use computer, such as a processor, a controller, a arithmetic logic unit (ALU), a digital signal processor, a microcomputer, a field programmable gate array (FPGA), a programmable logic unit (PLU), a microprocessor, or any device capable of executing and responding an instruction. A processing device may perform an operating system (OS) and one or more software applications performed in the OS. In addition, according to execution of software, the processing device may access, store, manage, process, and generate data. For convenience of understanding, it is described that one processing device is used, but it is obvious to one of ordinary skill in the art that the processing device may include a plurality of processing elements and/or various types of processing elements. For example, the processing device may include a plurality of processors or one processor and one controller. In addition, another processing configuration such as a parallel processor is also available.

Software may include a computer program, a code, an instruction, or a combination thereof, and may configure the processing device to operate in a desired manner or may independently or collectively control the processing device. The software and/or data may be permanently or temporarily embodied in a certain type of machine, a component, a physical device, virtual equipment, a computer storage medium or device, or a transmitted signal wave so as to be interpreted by the processing device or to provide instructions or data to the processing device. The software may be distributed to computer systems connected via a network and may be stored or executed in a distributed manner. The software and the data may be stored in one or more computer-readable recoding media.

The methods according to the example embodiments may also be embodied as programmed commands to be executed in various computer units, and then may be recorded in a non-transitory computer-readable recording medium. The non-transitory computer-readable recording medium may include one or more of the programmed commands, data files, data structures, or the like. The programmed commands recorded to the non-transitory computer-readable recording medium may be particularly designed or configured for the present disclosure or may be well known to one of ordinary skill in the art of computer software. Examples of the non-transitory computer-readable recording medium include magnetic media including hard disks, magnetic tapes, and floppy disks, optical media including CD-ROMs and DVDs, magneto-optical media including floptical disks, and hardware designed to store and execute the programmed commands in ROM, RAM, a flash memory, and the like. Examples of the programmed commands include not only machine code generated by a compiler but also include a high-level programming language to be executed in a computer by using an interpreter. The hardware apparatus can be configured to function as one or more software modules so as to perform operations for the invention, or vice versa.

While the example embodiments have been described with reference to drawings, it is obvious to one of ordinary skill in the art that various changes and numerous revisions may be made from the descriptions. For example, even if the described techniques are performed in a different order from that is provided, and/or described elements including a system, a structure, a device, a circuit, or the like are combined or associated in a manner different from that is provided, or are substituted or replaced with other elements or equivalents, an appropriate result may be achieved.

Therefore, other implements, other example embodiments, and equivalents to the scope of the present disclosure are included in the following claims.

What is claimed is:

1. A non-transitory computer readable recording medium storing a computer program, which when executed by at least one processor of an electronic apparatus, causes the at least one processor to execute a messenger service method comprising:
   extracting input time information associated with a plurality of input units included in a message transmitted from a message sender to a message receiver from input data included in the message, the input time information including input time unit information related to a time taken by the message sender to input each input unit of the plurality of input units of the message;
   calculating output time information associated with each output unit of a plurality of output units of the message based on the input time information, the calculating the output time information including comparing a number of the input units of the plurality of input units with a number of output units of the plurality of output units; and
   generating output data corresponding to the message for display on a display device of the message receiver, the output data generated based on the output time information and the plurality of output units of the message, wherein the calculating the output time information includes,
   in response to the number of the plurality of input units being less than the number of the plurality of output units, dividing the time taken to input one input unit from among the plurality of input units of the message by the number of output units corresponding to the one input unit to calculate an average output time of the corresponding output units as the output time information for each of the corresponding output units.

2. The non-transitory computer readable recording medium of claim 1, wherein the calculating the output time information includes:
   in response to the number of the plurality of input units being more than the number of the plurality of output units, determining a total sum of time taken to input the plurality of input units corresponding to one output unit from among the plurality of output units as the output time information for the one output unit.

3. The non-transitory computer readable recording medium of claim 1, wherein
   the extracting the input time information from the input data includes extracting input time information corresponding to deleted content from the input data; and
   the generating the output data includes excluding the extracted input time information corresponding to the deleted content from the output time information.

4. The non-transitory computer readable recording medium of claim 1, wherein
   the extracting the input time information from the input data includes extracting input time information corresponding to deleted content from the input data; and
   the generating the output data includes adding output time information corresponding to the deleted content to the output time information.

5. The non-transitory computer readable recording medium of claim 1, wherein the calculating the output time information includes adjusting the output time information based on a message sender's terminal device type.

6. The non-transitory computer readable recording medium of claim 1, wherein
   the extracting the input time information includes extracting one or more attributes of a message sender's terminal corresponding to the input time information of the input data, the one or more attributes including one or more of a location, a movement speed, temperature, or illuminance of the message sender's terminal; and
   the messenger service method further comprises,
   determining a circumstance of the message sender's terminal from the one or more attributes of the message sender's terminal, and generating output effect information for representing the circumstance of the message sender's terminal, the output data including the output effect information.

7. The non-transitory computer readable recording medium of claim 1, wherein each of the plurality of input units or each of the plurality of output units is one of a character, a syllable, a word, and a unit identified by spacing.

8. A messenger service method, the messenger service method comprising:
   extracting, using at least one processor, input time information associated with a plurality of input units included in a message transmitted from a message sender to a message receiver from input data included in the message, the input time information including input time unit information related to a time taken by the message sender to input each input unit of the plurality of input units of the message;
   calculating, using the at least one processor, output time information associated with each output unit of a plurality of output units of the message based on the input time information, the calculating the output time information including comparing a number of the input units of the plurality of input units with a number of output units of the plurality of output units; and
   generating, using the at least one processor, output data corresponding to the message for display on a display device of the message receiver, the output data generated based on the output time information and the plurality of output units of the message, wherein the calculating the output time information includes,
   in response to the number of the plurality of input units being less than the number of the plurality of output units, dividing the time taken to input one input unit from among the plurality of input units of the message by the number of output units corresponding to the one input unit to calculate an average output time of the corresponding output units as the output time information for each of the corresponding output units.

9. A messenger service system of an electronic apparatus, the messenger service system comprising:
   at least one processor configured to execute computer readable instructions stored on a memory to,
   extract input time information associated with a plurality of input units included in a message transmitted from a message sender to a message receiver from input data included in the message, the input time information including input time unit information related to a time taken by the message sender to input each input unit of the plurality of input units of the message;
   calculate output time information associated with each output unit of a plurality of output units of the message based on the input time information, the calculating the output time information including comparing a number of the input units of the plurality of input units with a number of output units of the plurality of output units; and
   generate output data corresponding to the message for display on a display device of the message receiver, the output data generated based on the output time information and the plurality of output units of the message, wherein the calculating the output time information includes,
   in response to the number of the plurality of input units being less than the number of the plurality of output units,
      divide the time taken to input one input unit from among the plurality of input units by the number of output units corresponding to the one input unit; and
      calculate an average output time of the corresponding output units as the output time information for each of the corresponding output units.

10. The messenger service system of claim 9, wherein the at least one processor is further configured to calculate the output time information by:
   in response to the number of the plurality of input units being more than the number of the plurality of output units,
      determine a total sum of time taken to input the plurality of input units corresponding to one output unit from among the plurality of output units as the output time information for the one output unit.

11. The messenger service system of claim 9, wherein the at least one processor is further configured to:
   extract, from the input data, input time information corresponding to deleted content from the input data; and
   exclude, from the output time information, the extracted input time information corresponding to the deleted content.

12. The messenger service system of claim 9, wherein the at least one processor is further configured to:
   extract, from the input data, input time information corresponding to deleted content from the input data; and
   adding output time information corresponding to the deleted content to the output time information.

13. The messenger service system of claim 9, wherein the at least one processor is further configured to:
   adjust the output time information based on a message sender's terminal device type.

14. The messenger service system of claim 9, wherein the at least one processor is further configured to:
   extract one or more attributes of a message sender's terminal corresponding to the input time information of the input data, the one or more attributes including one or more of a location, a movement speed, temperature, or illuminance of the message sender's terminal;
   determine a circumstance of the message sender's terminal from the one or more attributes of the message sender's terminal; and
   generate output effect information for representing the circumstance of the message sender's terminal, the output data including the output effect information.

15. The messenger service system of claim 9, wherein each of the plurality of input units or each of the plurality of output units is one of a character, a syllable, a word, and a unit identified by spacing.

* * * * *